April 10, 1951 G. O. CONNER 2,548,197
TEMPLATE
Filed Jan. 25, 1945 5 Sheets-Sheet 1

INVENTOR
Guy O. Conner

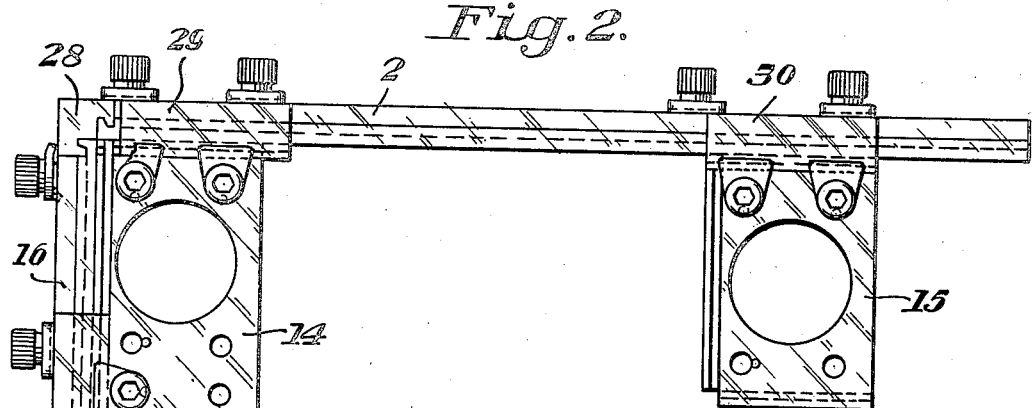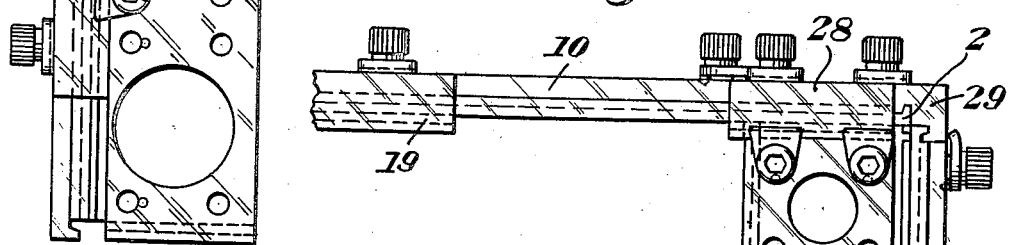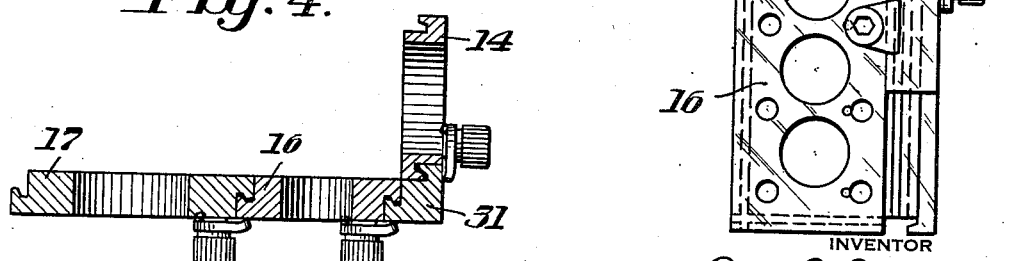

April 10, 1951     G. O. CONNER     2,548,197
TEMPLATE

Filed Jan. 25, 1945     5 Sheets-Sheet 3

INVENTOR
Guy O. Conner
by Stebbins, Blenner & Webb
his attorneys

April 10, 1951 G. O. CONNER 2,548,197
TEMPLATE
Filed Jan. 25, 1945 5 Sheets—Sheet 5

INVENTOR
Guy O. Conner

Patented Apr. 10, 1951

2,548,197

UNITED STATES PATENT OFFICE 2,548,197

TEMPLATE

Guy O. Conner, Cleveland Heights, Ohio

Application January 25, 1945, Serial No. 574,531

10 Claims. (Cl. 33—174)

This invention relates to templates. It relates particularly to templates adapted to be employed in laying out or operating upon work, especially templates made up of a plurality of members adapted to be assembled in various relations with respect to one another so as to make different specific forms of template adapted for particular jobs. For example, the invention is adapted for employment in templates used in connection with the drilling of work, such as the drilling of a plurality of holes disposed in accurately determined locations in the work. The invention will be described as embodied in two forms of template, each of such forms of template being provided with a plurality of drill jig bushings and being adapted for application to work to provide for drilling of the work through the drill jig bushings.

I provide a template comprising a plurality of cooperating members having complementary edge portions interengageable by bringing the members together in a direction transverse of said edge portions with one member disposed at any location along the edge of another, said edge portions accurately and firmly positioning the members relatively to one another, and means holding the interengaged members together. Desirably the template comprises at least two cooperating members each having a groove and a projection, the members being assemblable with the projection of each disposed in the groove of the other. Means are provided for holding together the thus assembled members. The holding means may be connected with one member and may engage the other member at a surface thereof remote from the first mentioned member so as to hold the members together with their respective projections each disposed in the groove of the other member. I prefer to provide a screw threaded into one of the members and a holding device held in place with respect to that member by the screw and engaging the other member in the manner above mentioned.

It is desirable to provide each of two cooperating members with an elongated groove tapering inwardly from relatively great to relatively small transverse dimension and an elongated projection parallel to the groove tapering in the direction from its crest to its base from relatively small to relatively great transverse dimension, the members being assemblable as indicated above with the projection of each disposed in the groove of the other and being held in thus assembled relationship by holding means such as above mentioned. Desirably the projection is disposed at and extends along an edge of the member carrying it and protrudes in a direction generally parallel to the plane of the edge; and desirably the groove is parallel and contiguous to the projection and is shaped to snugly receive the projection of the other member. The holding means is preferably effective for pressing each projection into the groove in which it is disposed to hold the assembled members together.

In one form the template comprises a plate having a projection protruding beyond an edge of the plate generally parallel to the plane of the plate and of less thickness than the plate and a rib on the projection spaced from said edge of the plate but opposite a portion of said edge in a direction generally in the plane of the plate, the rib and said edge defining the side faces of a groove adapted to receive the rib of a similar plate to enable the plates to be connected together.

My template may comprise a member recessed along an edge thereof adjacent a face of the member to provide at said edge a projection of less thickness than the body of the member so as to adapt another member similarly recessed along an edge thereof to be interfitted therewith by introduction of the projection of the other member into the recess thereof and introduction of the projection thereof into the recess of the other member. Preferably the template comprises a generally rectangular plate recessed along its edges so as to be of greater thickness at its center than at its edges, the plate being recessed adjacent one face along two adjacent edges and being recessed adjacent the opposite face along the remaining two edges so as to adapt a similar plate to be interfitted therewith at any edge thereof by introduction of an edge of the similar plate into a recess along an edge thereof and introduction of said edge thereof into said recess of the similar plate.

The template may comprise a member having a first flange projecting outwardly past an edge thereof, a second flange projecting outwardly past another edge thereof, said flanges projecting outwardly in non-coplanar, non-parallel directions, and a rib on at least one of said flanges opposite the edge past which said flange projects so as to form a groove between the rib and said edge.

My template may take an almost infinite variety of forms and by proper selection and assembly of desired elements or members may be adapted for application to a great many different kinds of work. The invention embodies many features of novelty which will become apparent as the following description of certain present preferred embodiments thereof proceeds.

In the interest of brevity I have not attempted in the introductory portion of this specification to describe or even refer to all of the novel features of the invention, but simply to mention a few of the principal features. Other details, objects and advantages of the invention will become apparent as the following description of certain present preferred embodiments thereof proceeds.

In the accompanying drawings I have shown certain present preferred embodiments of the invention, in which Figure 1 is a plan view of a template;

Figure 2 is a front elevational view of the template shown in Figure 1, i. e., as viewed from the bottom of Figure 1, with a portion cut away;

Figure 3 is a fragmentary side elevational view of the template shown in Figure 1, i. e., as viewed from the left-hand side of Figure 1;

Figure 4 is a cross-sectional view taken on the line IV—IV of Figure 3;

Figure 1:
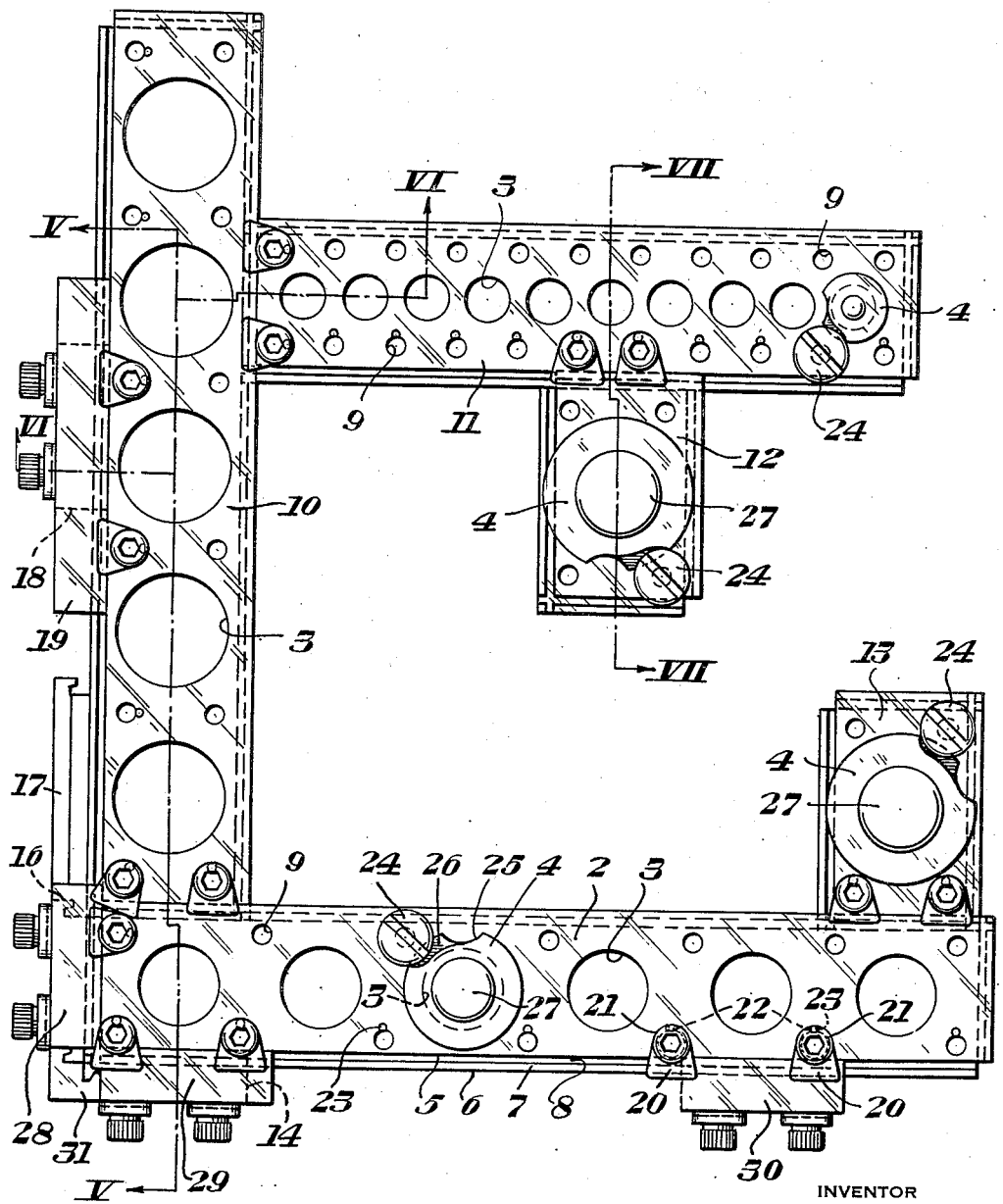

Referring now more particularly to the drawings, one form of template is shown in Figures 1 to 7, inclusive, and another form is shown in Figures 8 to 14, inclusive. As will be seen, some of the members or elements are used in both forms and others thereof are used in only one of the forms. It is to be understood that the various template members may be selected and assembled in any desired manner, the selection and precise manner of assembly being determined by the particular work to be done. Both forms shown in the drawings are templates for the drilling of work. The template shown in Figures 1 to 7, inclusive, is for the drilling of work having a rectangular corner, while the template shown in Figures 8 to 14, inclusive, is for the drilling of work of irregular shape and in which the holes to be drilled are positioned generally about a center. In both forms standard drill jig bushings are employed.

Referring now more particularly to the form of template shown in Figures 1 to 7, inclusive, there is provided a member 2 which is in the form of an accurately dimensioned and machined rectangular steel plate. The plate is provided with six circular bores 3 which extend therethrough and which are spaced at equal intervals along the plate. The bores 3 are for the reception of drill jig bushings of standard form, one of which is shown at 4. Drill jig bushings are made in a range of standard sizes, each such bushing being of generally hollow cylindrical form with a radial flange at its upper end, the flange being adapted to seat on a template to which the bushing is applied and to cooperate with known means, presently to be referred to, for holding the bushing in place. The lower cylindrical portion of the bushing is machined to accurate outside diameter and the bores 3 in the plate 2 are drilled and finished to accurate inside diameter to receive the lower cylindrical portion of a standard drill jig bushing snugly and with so little clearance that the bushing can have no appreciable lateral play or lost motion in the bore. As will presently be seen, different members or elements of the template have bushing receiving bores of different sizes so that appropriate members may be selected and appropriately positioned in a template to receive bushings of desired sizes.

Figure 5:
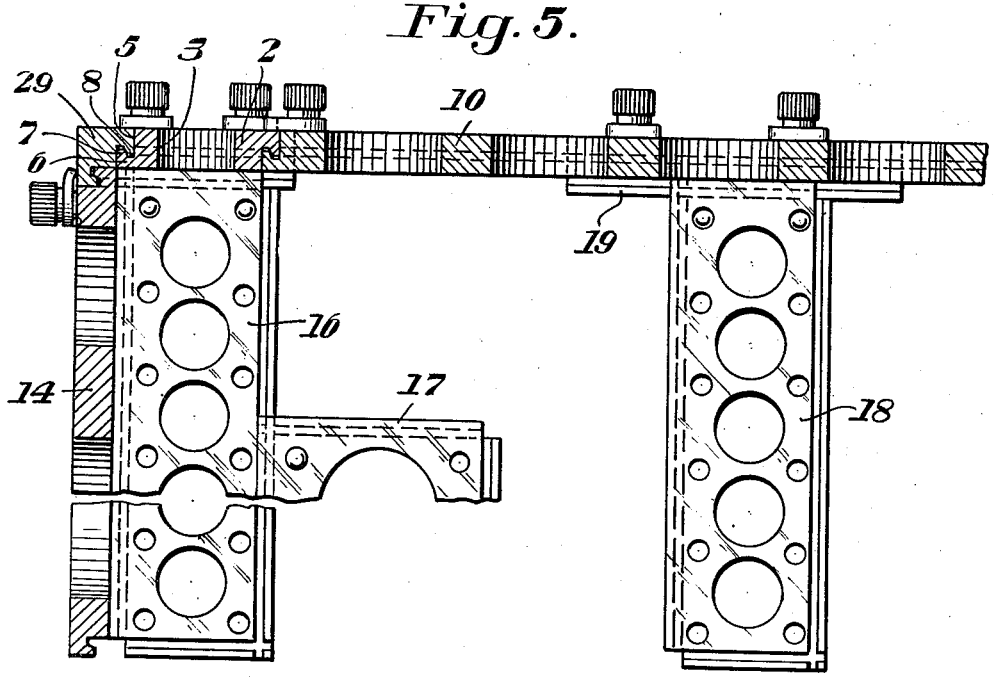
Figure 5 is a cross-sectional view taken on the line V—V of Figure 1.

The plate 2 has a projection protruding beyond each of the four edges of the plate body. The edge of the plate body which is nearest and parallel to the bottom of Figure 1 is designated 5 (see also Figure 5). Protruding beyond the edge 5 is a projection designated as a whole by reference numeral 6. The lower face of the projection 6 is flush with the lower face of the plate body. The projection 6 carries a rib 7 spaced from the edge 5 but in opposed relationship thereto so that the rib 7 and the edge 5 define the side faces of a groove 8. The inner face of the rib 7 is inclined upwardly and outwardly as shown in Figure 5 so that the groove 8 tapers inwardly from relatively great to relatively small transverse dimension. The rib 7 tapers in the direction from its crest to its base from relatively small to relatively great transverse dimension. The rib 7 has its crest well below the upper surface of the plate 2.

The left-hand edge of the plate 2, viewing Figure 1, is provided with a ribbed projection exactly similar to the ribbed projection 6 just described and similarly positioned on the plate. The upper and right-hand edges of the plate 2 viewing Figure 1 also have similar ribbed projections but these projections are inverted with respect to the projections at the lower and left-hand edges of the plate, i. e., they are flush with the upper face of the plate and the ribs project downwardly, forming downwardly open grooves. This is clearly shown in Figure 5.

The plate 2 is also provided with threaded bores 9. These are arranged in rows along the longitudinal edges of the plate and each of them is threaded completely through the plate so as to be adapted to receive a screw applied from either face of the plate. Each threaded bore 9 may receive either a screw used for fastening together members or elements of the template or a screw for holding a drill jig bushing in place in one of the bores 3. Generally speaking, screws for fastening to the plate 2 another template member are threaded into the threaded bores 9 of the lower row of such bores, viewing Figure 1, from the surface of the plate 2 which is nearest the observer viewing that figure, while screws for holding drill jig bushings in position in the bores 3 are threaded into the threaded bores 9 of the upper row of such bores, viewing Figure 1, from the surface of the plate 2 which is nearest the observer viewing that figure. This will be explained further below.

In the template shown in Figures 1 to 7, inclusive, there are in addition to the rectangular plate 2 other generally similar rectangular plates designated respectively by reference numerals 10 to 18, inclusive. All of these plates are similar in that each has ribbed projections protruding beyond its edges just as does the plate 2. Each plate has one or more bores for receiving a drill jig bushing or bushings. These bores are of such size as to snugly receive drill jig bushings of the standard sizes.

Figure 6:
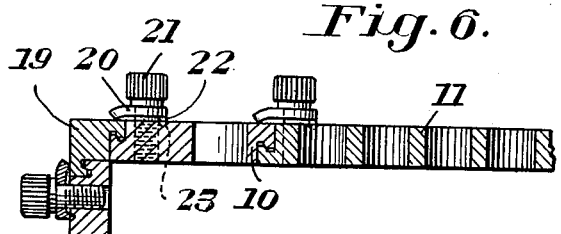
Figure 6 is a cross-sectional view taken on the line VI—VI of Figure 1.
Figure 7:
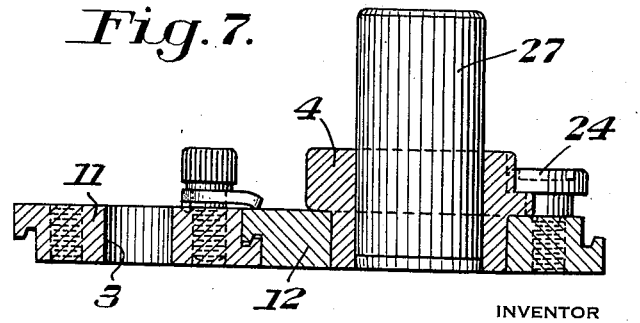
Figure 7 is a cross-sectional view taken on the line VII—VII of Figure 1.

The ribbed projections at the edges of the template members are for the purpose of enabling such members to be joined together and maintained in assembled relationship in accurate predetermined relative positions. The plates may be joined directly to one another if they are to be coplanar or they may be joined to one another through an intermediate connector if they are to lie with their planes intersecting. The connectors are formed with ribbed projections protruding beyond edges thereof in precisely the same way as are the plates except that in the connectors the projections protrude beyond edges which intersect in a line parallel to the projections. See, for example, the connector 19 which connects together the plate 10 and the plate 18 (Figures 1 and 6). The connector and the joints between the connector and the respective plates are clearly shown in cross section in Figure 6. As there shown, the connector has ribbed projections protruding beyond the right-hand edge and the lower edge thereof so as to adapt the connector to join together plates lying in planes at right angles to one another.

Any two plates or any plate and any connector may be joined together by bringing them together in a direction transverse of their adjacent edge portions and so as to dispose the rib of each within the groove of the other. The ribs and grooves are so shaped and positioned that when two members are thus brought together the rib of each fits snugly within the groove of the other. It is not necessary to relatively move the members longitudinally of their adjacent edges to make the connection. Any member may be connected to any other member at any desired point along any edge of the latter. When any two members are thus interengaged their faces lie flush and parallel with one another.

The provision of the tapered ribs and grooves, while not in all cases essential, is of great advantage in facilitating rapid assembly of my template members and in insuring proper relative positioning thereof. The widths of the grooves are preferably proportioned relatively to their depths so that when a tapered rib of one member enters a tapered groove of another member the contact between the members will be entirely at the side faces of the ribs and grooves, the crest of each rib being slightly spaced from the bottom of the groove receiving it. Also the outer edge of each ribbed projection is preferably parallel to the edge of the member proper beyond which the projection protrudes. When two members are assembled as above mentioned the outer edge of the protruding ribbed projection of each lies against the edge of the other member as clearly shown in Figure 6. Thus I provide for remarkable accuracy of assembly as well as facility of assembly and great flexibility.

When members of my template have been assembled as above described they are held together by means provided for that purpose. The holding means are preferably connected with one member and engage the other member at a surface thereof remote from the first mentioned member. I preferably employ holding devices which have generally the form of non-circular washers each designated by reference numeral 20. Associated with each washer 20 is a headed screw 21. The bore of the washer is of such size as to freely but without any considerable amount of lost motion receive the threaded shank of the screw 21 with which it is associated. The outside diameter of the screw head is, of course, greater than the diameter of the bore in the washer so that when the screw is turned down it will press downwardly on the washer. The screws 21 are adapted to be turned down by any convenient tool, such, for example, as an Allen wrench which enters a socket in the screw head.

When two members of the template have been assembled in the manner above described and positioned as desired relative to each other a screw 21 and washer 20 are applied to one of the members, the screw being turned down in one of the threaded bores 9 with a portion of the washer 20 overlapping the other member, as clearly shown in Figure 6. The washer preferably has a straight edge portion perpendicular to a radial line drawn through the axis of the circular opening in the washer and that edge portion is preferably bent somewhat downwardly or toward the work, as clearly shown. This insures that when the screw is tightened the straight edge portion of the washer will bear firmly against the member which is to be connected with the member into which the screw is threaded. Each of the washers also has a projection 22 protruding from its surface which is disposed against the template member to which it is fastened by the screw, such projection being adapted to enter a depression 23 formed in the surface of that member. This holds the washer against turning relatively to the template member when the screw is turned down to press the washer thereagainst. A depression 23 is provided adjacent each of the threaded bores 9 at the face of the template member toward which the adjacent ribbed projection is directed. Those threaded bores 9 do not ordinarily receive screws 21 from the opposite face of the template member so no depressions 23 are provided adjacent the bores at such opposite face.

Slotted headed screws 24 are provided for holding the drill jig bushings 4 in place in the template members. The drill jig bushings shown are of standard form, each having its flange cut away throughout its depth to provide an axially extending recess 25 enabling the bushing to be inserted and replaced without removing the screw 24. Adjacent the recess 25 the bushing flange is partially cut away at 26 in usual manner so that when the bushing is inserted and turned in the clockwise direction the portion 26 of the bushing flange will underlie the head of the screw 24. The screw is effective for holding the bushing against being pulled out of the bore of the template when the drill is retracted after drilling a hole through the bushing into the work.

The drill jig bushings are adapted to receive pins 27 to enable measurement of distances between the axes of the bushings. This is done by inside calipers, the radii of the two pins between which a measurement is being made being added to the distance actually measured by the calipers to determine the distance between the axes of the bushings.

Two of the depressions 23 are provided adjacent each of the threaded bores 9 which is disposed at a corner of one of the template members where two of the ribbed projections protrude toward the face of the member in which the depressions are formed. This is done so that one of the washers 20 may be positioned with its straight edge portion overhanging either of the two edges of the member which come together at the corner.

The template may be maintained in place on the work in any suitable manner, as, for example, by the use of C clamps. The clamps are not shown but they are used in normal manner.

Only one of the screw and washer combinations 20—21 is necessary at any joint between two template members but for safety I generally employ two such fastening means at each joint. The members are first assembled in approximately correct position with the screws 21 turned down lightly so as to hold the members against unintentional relative movement. When the parts are in that condition one of the members may be tapped with a hammer and moved a short distance along the joint relatively to the other member until the members are brought into proper relationship. The screws are then screwed down tightly with a wrench.

The form of template shown in Figures 1 to 7, inclusive, is purely a fanciful form and is shown simply to illustrate the extreme flexibility of the template. Ordinarily a template of considerably less complexity than the template shown will serve for all practical purposes. The template shown would be applied to the work by placing the corner formed by the plates 2, 14 and 16 over the corner of the work to align the template to the work and then applying C clamps to hold the template in place. A connector 28 connects the member 16 with the member 2, a connector 29 connects the member 14 with the member 2 and a connector 30 connects the member 15 with the member 2. The connectors 28, 29 and 30 are similar in all respects to the connector 19 except that the connector 19 is shown as being somewhat longer than the connectors 28, 29 and 30. The length of these connectors is optional but they will ordinarily be as long as the width of the template plates. The plates 2 and 10, 10 and 11, 11 and 12, 2 and 13 and 16 and 17 are connected directly together. The respective plates of each of these pairs lie in the same plane and hence the plates of each pair are adapted to be connected directly to each other. An extra connector 31 is used between the plates 14 and 16 simply for increased rigidity. The connector 31 is not essential as the respective members 14 and 16 are each rigidly connected with the member 2, but the connector 31 insures accurate maintenance of the relative positions of the members.

Referring now to the template shown in Figures 8 to 14, inclusive, that template is adapted for use primarily on work having a center and in which the holes to be bored in the work are to be disposed at certain predetermined distances from the center. The work is indicated in outline by the chain line 32 in Figure 8. The template comprises a base plate 33 of poligonal form, shown as being hexagonal. Each of its edges is formed exactly like the edges of the template members of the form of structure shown in Figures 1 to 7, inclusive. This will be apparent upon inspection of Figure 9. The base plate 33 has a bore 34 therethrough and the undersurface of the base plate is recessed at 35 coaxially with the bore 34. A transparent member 36 having means 37 thereon indicating a center is positioned in the recess 35 and maintained in place therein by a ring 38 held in place by screws 39. The center indicating means 37 are positioned on the transparent member 36 so that the center indicated is in the axis of the bore 34.

Elongated template bars 40 are connected with the base plate 33 at the respective edge portions thereof and radiate from the center 37. The bars 40 may be identical with the elongated template members or plates of the template shown in Figures 1 to 7, inclusive, but are shown as being of a somewhat different form which is less costly of material and labor. Each of the bars 40 has at its inner end where it is connected with the base plate 33 a ribbed projection 41 forming a downwardly open groove and also has similar projections 43 forming downwardly open grooves along the two side edges of the bar (Figure 13).

A cap member 44 cooperates with the base plate 33, the cap member having a central cylindrical projection 45 adapted to enter the bore 34 of the base plate 33 and to be snugly received therein. The cap member 44 has six unthreaded screw receiving bores 46 equally spaced thereabout, one opposite the center of each edge of the cap member. The base plate 33 has six similarly positioned threaded bores 47. A headed screw 48 is adapted to pass loosely but snugly through each of the bores 46 in the cap member 44 and to be threaded into one of the bores 47 in the base plate 33. The edges of the cap member 44 overlie the ends of the six bars 40. When the screws 48 are tightened the cap member 44 cooperates with the base plate 33 to hold the radiating bars 40 in position, thus in effect forming the spokes of a wheel radiating from the center 37.

Plates 49 which may be identical with the plates 12, 15 and 17 of the form of structure shown in Figures 1 to 7, inclusive, are provided and are connected with the bars 40 in similar manner as shown. Each of the plates 49 carries a drill jig bushing held in place by a screw 50 in the same manner as above described with respect to the drill jig bushing 4.

Figure 8:
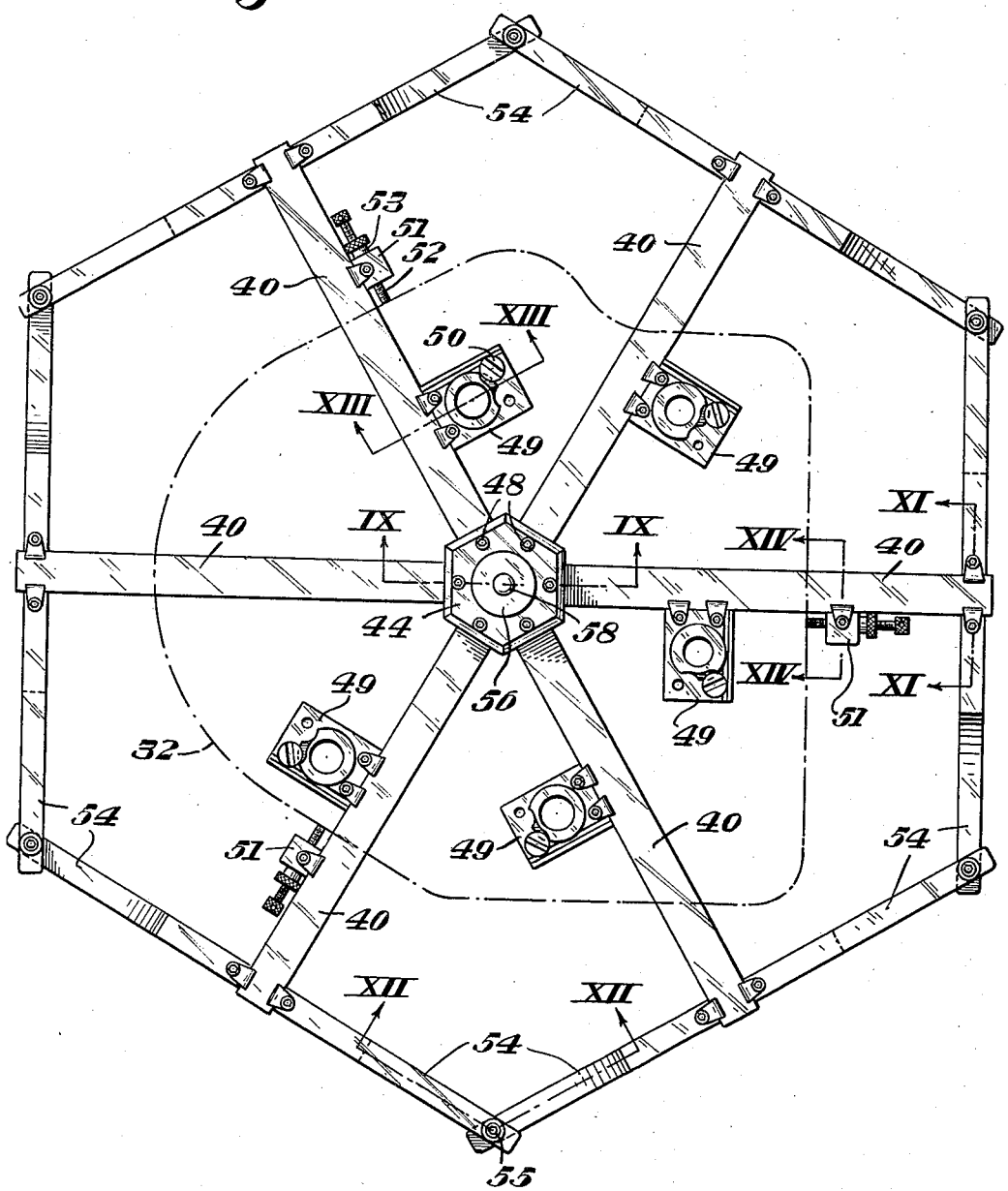
Figure 8 is a plan view of another form of template.
Figure 9:
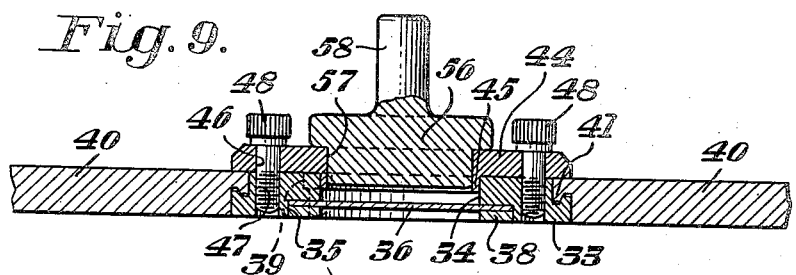
Figure 9 is an enlarged fragmentary cross-sectional view taken on the line IX—IX of Figure 8.
Figure 10:
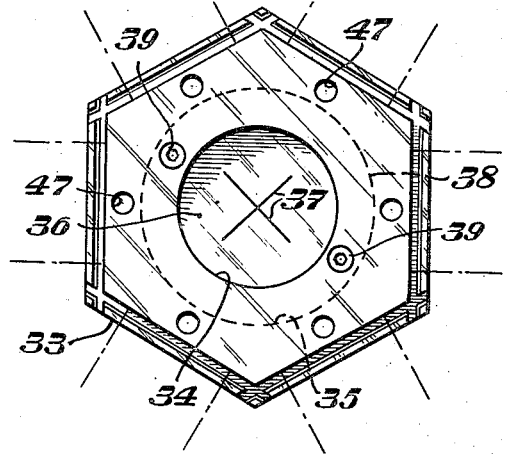
Figure 10 is a plan view of one of the members of the assembly shown in Figure 9.
Figures 13, 14:
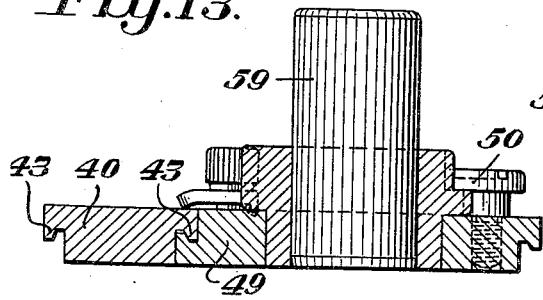
Figure 13 is an enlarged cross-sectional view taken on the line XIII—XIII of Figure 8.
Figure 14 is an enlarged cross-sectional view taken on the line XIV—XIV of Figure 8.

Positioning members 51 are also similarly connected with certain of the bars 40, one such positioning member being shown in cross-section in Figure 14. It consists of a block through which is threaded an elongated positioning screw 52 the inner end of which is adapted to engage the work. The screw is held in fixed adjusted position by a locking nut 53. As shown in Figure 8 three of the positioning members are employed, they serving to properly position the template with respect to the work with the center 37 in alignment with the center of the work.

Figure 11:
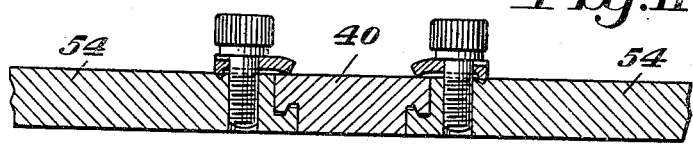
Figure 11 is an enlarged fragmentary cross-sectional view taken on the line XI—XI of Figure 8.
Figure 12:
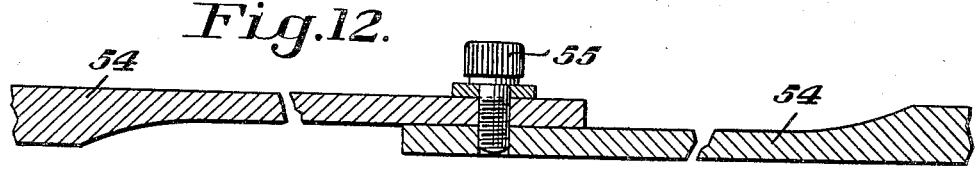
Figure 12 is an enlarged fragmentary cross-sectional view taken on the line XII—XII of Figure 8.

Bracing members 54 are connected with the respective bars 40 at their outer ends as shown in Figures 8 and 11, and adjacent bracing members 54 are connected together intermediate bars 40 by a screw 55 (Figure 12). Each of the bracing members 54 is formed so that its end opposite the end connected with a bar 40 either underlies or overlies the adjacent bracing member. Thus the bracing members have portions which overlap with adjacent surfaces parallel and in contact so that they are adapted to be connected by the screws 55 as shown in Figure 12 without any tendency to deform the template.

There is provided a plug 56 which is adapted to enter a bore 57 in the cap member 44, which bore is coaxial with the bore 34 in the base plate 33. When the template is being lined up with the work the plug 56 is withdrawn but when the template has been centered to the work the plug is inserted. It has a central cylindrical projection 58 which, when the plug is in place, is coaxial with the bores 34 and 57 and whose axis passes through the center 37. The projection 58 is adapted to be used for the measurement of distances from the center to the drill jig bushings carried by the plates 49 fastened to the bars 40. Pins are provided (see pin 59, Figure 13) for use in the drill jig bushings, the distances being measured by inside calipers in the manner above described with respect to the form of template shown in Figures 1 to 7, inclusive.

Parts employed in the template shown in Figures 1 to 7, inclusive, and parts employed in the template of Figures 8 to 14, inclusive, may be used interchangeably and any of such parts may be combined with any other thereof to produce different forms of template for different specific uses. Certain of the advantages of my template arise, as above indicated, from its flexibility, the ease and rapidity with which the members can be assembled and the rigidity of the assembled structure. The fitting together of the template members is a very simple and speedy operation and they may be tightened together with a few turns of an Allen wrench. The members are as easily disassembled and they are adapted for continual reuse and will withstand years of regular usage.

While I have shown and described certain present preferred embodiments of the invention, it is to be distinctly understood that the invention is not limited thereto but may be otherwise variously embodied within the scope of the following claims.

I claim:

1. A template comprising a template member having a first flange projecting outwardly past an edge thereof, a second flange projecting outwardly past another edge thereof, said flanges projecting outwardly in non-coplanar, non-parallel directions, a rib on at least one of said flanges opposite the edge past which said flange projects so as to form a groove between the rib and said edge, a washer overlapping said last mentioned edge opposite said rib and means fastening the washer to the member.

2. A template comprising a template member having a first flange projecting outwardly past an edge thereof, a second flange projecting outwardly past another edge thereof, said flanges projecting outwardly in non-coplanar, non-parallel directions, a rib on each of said flanges opposite the edge past which said flange projects so as to form a groove between the rib and said edge, a washer overlapping each of said edges opposite the corresponding rib and means for fastening the washers to the member.

3. A template comprising a template member having intersecting faces having two projections respectively protruding outwardly past two such faces and respectively spaced from the junctures of said faces with a third face, a fastening device connected with the member and having a portion disposed adjacent the third face and a holding device adapted to be operatively positioned relatively to the member by said portion of the fastening device, the holding device being adapted selectively to protrude outwardly past said intersecting faces opposite said respective projections.

4. A template comprising a member of generally rectangular plate form having at each of two adjacent edges means adapted to interfit with another member to be fastened to said member, said member also having therethrough remote from said means an opening positioned to receive from either face of said member means for attaching to said member holding means adapted when attached at one face of said member to cooperate with one of said first mentioned means to fasten another member to said member and when attached at the opposite face of said member to cooperate with the other of said first mentioned means to fasten another member to said member.

5. A template comprising a member of generally rectangular plate form having at each of two adjacent edges means adapted to interfit with another member to be fastened to said member, said member also having therethrough a threaded opening positioned to threadedly receive from either face of said member a screw for attaching to said member holding means adapted when attached at one face of said member to cooperate with one of said first mentioned means to fasten another member to said member and when attached at the opposite face of said member to cooperate with the other of said first mentioned means to fasten another member to said member.

6. A template comprising a member of generally rectangular plate form having at each of two adjacent edges a flange projecting generally parallel to the plane of the member, each of said flanges having at a side face thereof means adapted to interfit with another member to be fastened to said member but said means being disposed at the side face of one flange nearest one face of said member and at the side face of the other flange nearest the opposite face of said member, said member also having therethrough an opening positioned to receive from either face of said member means for attaching to said member holding means adapted when attached at one face of said member to cooperate with one of said flanges to fasten another member to said member and when attached at the opposite face of said member to cooperate with the other flange to fasten another member to said member.

7. A template comprising two members of generally plate form each having adjacent an edge thereof means for interfitting with a connector and a connector having portions interfitting with said respective means connecting said members together in relative position with their planes intersecting and their adjacent edges substantially in contact.

8. A template comprising two members of generally plate form each having adjacent an edge thereof means for interfitting with a connector, a connector having portions interfitting with said respective means and holding means maintaining said interfitting portions and means in interfitting relationship whereby to connect said members together with their adjacent edges substantially in contact.

9. A template comprising two members of generally plate form each having adjacent an edge thereof means for interfitting with a connector, a connector having portions interfitting with said respective means and holding means fastened to said members maintaining said interfitting portions and means in interfitting relationship whereby to connect said members together with their adjacent edges substantially in contact.

10. A template comprising two cooperating members of which one has means for positioning it relatively to a structure and the other has means for guiding a drill or the like relatively to said structure, each of said members having a groove and a projection, the grooves and projections being cooperatively shaped so that the members are assemblable with the projection of each disposed in the groove of the other by relative movement only transversely of the grooves and projections, each projection having an inclined face positioned to engage a corresponding inclined face of the other so that the projections do not bottom in the grooves, and means for holding the thus assembled members together.

GUY O. CONNER.

REFERENCES CITED

The following references are of record in the file of this patent:

UNITED STATES PATENTS

| Number | Name | Date |
|---|---|---|
| 366,652 | Darling | July 19, 1887 |
| 389,370 | Evans | Sept. 11, 1888 |
| 405,562 | King | June 18, 1889 |
| 646,449 | McAllister | Apr. 3, 1900 |
| 652,995 | Calkins | July 3, 1900 |
| 765,930 | Mahony | July 26, 1904 |
| 833,917 | Burchard | Oct. 23, 1906 |
| 866,755 | Wells | Sept. 24, 1907 |
| 918,947 | Boljahn | Apr. 20, 1909 |
| 1,053,810 | Hedges | Feb. 18, 1913 |
| 1,064,593 | Ash | June 10, 1913 |
| 1,157,469 | Von Philp | Oct. 19, 1915 |
| 1,235,031 | Holmgren | July 31, 1917 |
| 1,545,424 | Heinrich | July 7, 1925 |
| 1,741,342 | Schwartz | Dec. 21, 1929 |
| 1,852,469 | Muller | Apr. 5, 1932 |
| 1,871,178 | Hudson | Aug. 9, 1932 |
| 2,118,880 | Davis | May 31, 1938 |
| 2,156,277 | Corbin, Jr. | May 2, 1939 |
| 2,166,692 | Ray | July 18, 1939 |
| 2,233,901 | Scacchetti | Mar. 4, 1941 |
| 2,342,033 | Barabas | Feb. 15, 1944 |
| 2,361,706 | Panlecka | Oct. 31, 1944 |

FOREIGN PATENTS

| Number | Country | Date |
|---|---|---|
| 404,117 | Great Britain | Jan. 11, 1934 |